(12) United States Patent
Barwig et al.

(10) Patent No.: US 8,720,534 B2
(45) Date of Patent: May 13, 2014

(54) HEAT EXCHANGER, PARTICULARLY FOR A MOTOR VEHICLE

(75) Inventors: Juergen Barwig, Stuttgart (DE); Heinz Czemmel, Rutesheim (DE); Christian Domes, Stuttgart (DE); Peter Geskes, Ostfildern (DE); Jens Ruckwied, Stuttgart (DE); Gerd Schleier, Schwaikheim (DE); Bernd Spitznagel, Stuttgart (DE)

(73) Assignee: Behr GmbH & Co. KG, Stuttgart (DE)

( * ) Notice: Subject to any disclaimer, the term of this patent is extended or adjusted under 35 U.S.C. 154(b) by 662 days.

(21) Appl. No.: 12/677,531

(22) PCT Filed: Sep. 10, 2008

(86) PCT No.: PCT/EP2008/007398
§ 371 (c)(1),
(2), (4) Date: Jun. 22, 2010

(87) PCT Pub. No.: WO2009/033643
PCT Pub. Date: Mar. 19, 2009

(65) Prior Publication Data
US 2010/0276131 A1  Nov. 4, 2010

(30) Foreign Application Priority Data
Sep. 11, 2007 (DE) .......................... 10 2007 043 059

(51) Int. Cl.
*F28F 9/013* (2006.01)
*F28D 7/06* (2006.01)

(52) U.S. Cl.
USPC ............ 165/162; 165/145; 165/157; 165/160

(58) Field of Classification Search
CPC .......... F28F 9/013; F28D 7/06; F28D 7/0025; F28D 7/033; F28D 21/0003
USPC .................................. 165/157, 145, 162, 160
See application file for complete search history.

(56) References Cited

U.S. PATENT DOCUMENTS

| | | | | |
|---|---|---|---|---|
| 2,181,486 A | * | 11/1939 | Jenkins ......................... | 165/162 |
| 2,392,638 A | * | 1/1946 | Bowman et al. .............. | 165/161 |
| 3,746,083 A | * | 7/1973 | Tiefenbacher ................ | 165/145 |
| 4,307,777 A | * | 12/1981 | Chwyla ......................... | 165/162 |
| 4,685,430 A | | 8/1987 | Ap | |

(Continued)

FOREIGN PATENT DOCUMENTS

| | | |
|---|---|---|
| DE | 39 29 294 | 2/1983 |
| DE | 38 40 333 | 3/1990 |

(Continued)

OTHER PUBLICATIONS

Japanese Office action Nov. 13, 2012.

*Primary Examiner* — Leonard R Leo
(74) *Attorney, Agent, or Firm* — Muncy, Geissler, Olds & Lowe, P.C.

(57) ABSTRACT

The invention relates to a heat exchanger, particularly for a motor vehicle, comprising a plurality of exchanger tubes (3) attached to at least one floor for conveying a first fluid, wherein the exchanger tubes (3) are disposed in a housing through which a second fluid flows, wherein a holding member (5) is disposed inside the housing, wherein at least two of the exchanger tubes (3) are supported relative to one another by means of the holding member (5).

16 Claims, 15 Drawing Sheets

(56) References Cited

U.S. PATENT DOCUMENTS

| | | | |
|---|---|---|---|
| 4,834,173 A * | 5/1989 | Weiss et al. ............... 165/162 |
| 5,033,542 A * | 7/1991 | Jabs ........................... 165/162 |
| 5,181,560 A * | 1/1993 | Burn ........................... 165/162 |
| 5,915,472 A | 6/1999 | Takikawa et al. |
| 7,044,210 B2 * | 5/2006 | Usui ........................... 165/177 |
| 2006/0231243 A1 | 10/2006 | Sugihara et al. |

FOREIGN PATENT DOCUMENTS

| | | |
|---|---|---|
| DE | 3906241 | 8/1990 |
| DE | 4139104 | 5/1993 |
| DE | 102005054731 | 5/2007 |
| DE | 102007013302 | 9/2007 |
| GB | 2394038 | 4/2004 |
| JP | 59007887 | 1/1984 |
| JP | 6039957 | 5/1986 |
| JP | 62242796 | 10/1987 |
| JP | 7004872 | 1/1995 |
| JP | 9292196 | 11/1997 |
| JP | 11264691 | 9/1999 |
| JP | 2000161872 | 6/2000 |
| JP | 2000258087 | 9/2000 |
| JP | 2002147988 | 5/2002 |
| JP | 2002327654 | 11/2002 |
| JP | 2004012105 | 1/2004 |
| JP | 2005016939 | 1/2005 |
| WO | 03/104733 | 12/2003 |
| WO | 2006087201 | 8/2006 |
| WO | 2007/047603 | 4/2007 |
| WO | 2007/104580 | 9/2007 |
| WO | 2007/144911 | 12/2007 |

* cited by examiner

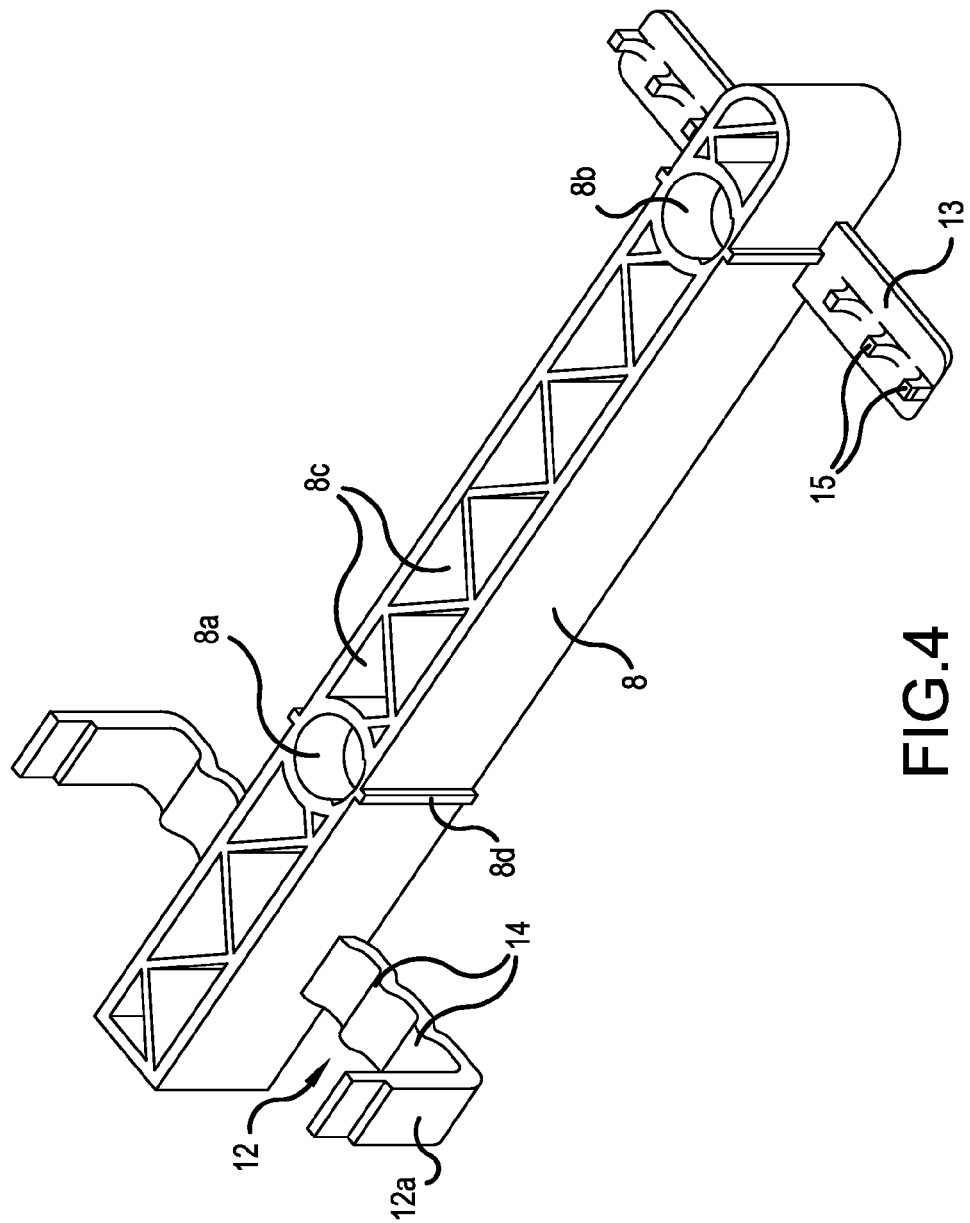

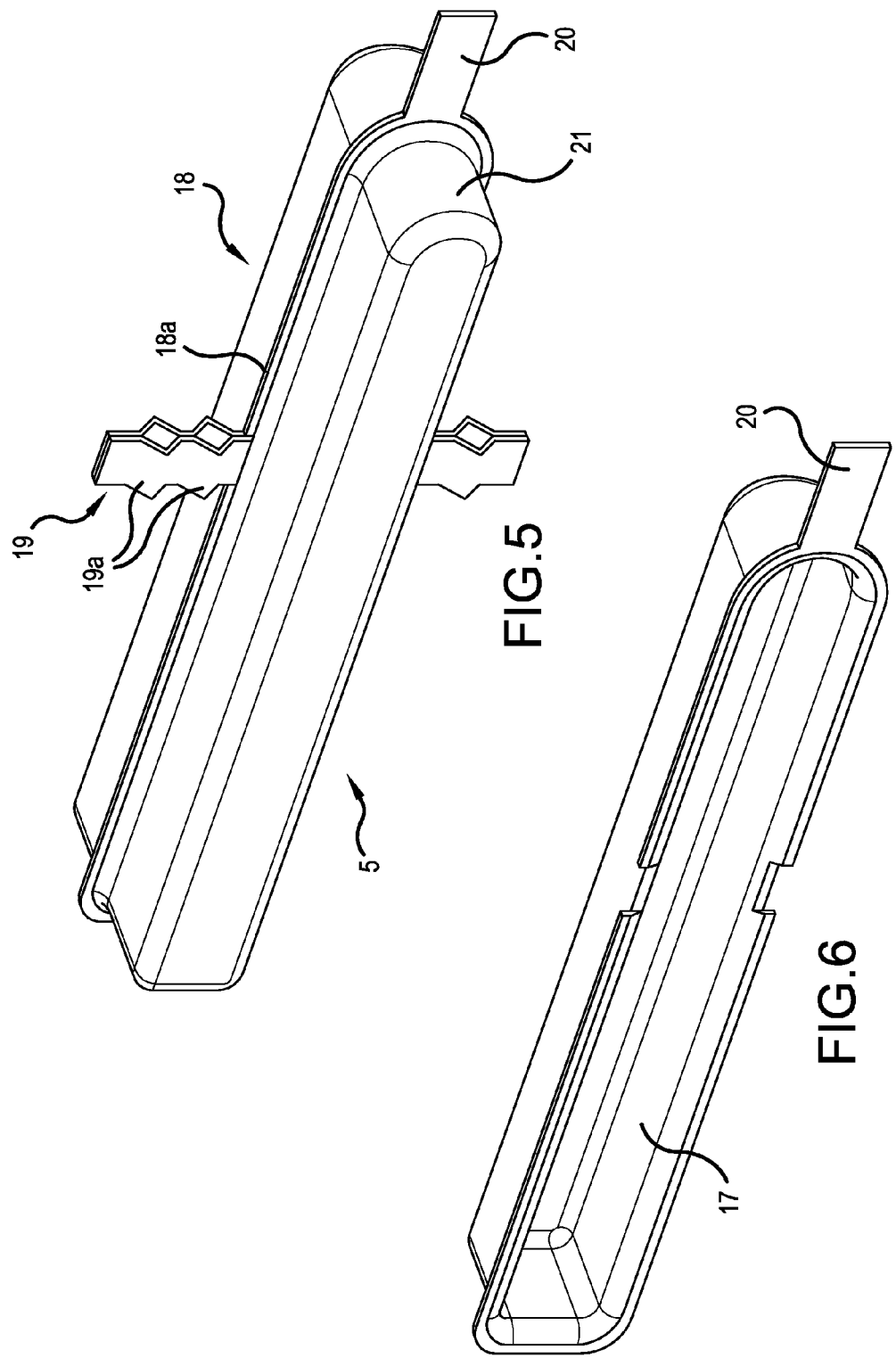

HEAT EXCHANGER, PARTICULARLY FOR A MOTOR VEHICLE

BACKGROUND OF THE INVENTION

The present invention relates to a heat exchanger, particularly for a motor vehicle.

From the construction of heat exchangers for motor vehicles, here particularly in the field of the indirect cooling of recycled exhaust gas or charge air by a liquid coolant, tube-bundle heat exchangers are known in which a bundle of exchanger tubes, extending parallel at least in places, are fed through a housing through which a coolant flows. Owing to mechanical vibration and the pulsed gas flow, such heat exchangers are subject to significant vibrations. With a corresponding length of the exchanger tubes, strong loads due to vibration occur in the region where the tubes are fastened on a base of the heat exchanger.

SUMMARY OF THE INVENTION

It is an object of the invention to provide a heat exchanger which is particularly stable in respect of mechanical vibrations.

For a heat exchanger as mentioned in the introduction, this object is achieved according to the invention disclosed herein. Owing to the mutual bracing of at least two of the exchanger tubes by means of the holding member, vibrations of the tubes which occur are avoided or at least dampened by the increased mechanical stiffness. The bracing by the holding member in the context of the invention takes place at a distance from a base of the heat exchanger, in which the tubes open.

The heat exchanger is particularly advantageously an exhaust gas cooler for cooling recycled exhaust gas of a combustion engine. At least one of the exchanger tubes may in particular be formed as a press-drawn section, in particular based on aluminum. It has been found that aluminum press-drawn sections are surprisingly corrosion-resistant against the hot exhaust gases and the acidic condensate formed when cooling. On the other hand, aluminum press-drawn sections can be produced well, which allows economical mass production of exhaust gas coolers for motor vehicles. In this application, it should be borne in mind that the corrosion-resistant properties of aluminum press-drawn sections are probably due to the heat treatment during press drawing and therefore the formation of a specific crystal structure of the material. During production of such an exhaust gas heat exchanger, it is therefore generally expedient to avoid heating the press-drawn sections to high temperatures, for example by soldering in a soldering furnace, after pre-assembly of the heat exchanger, so as not to modify the corrosion-resistant crystal structure. Rather, in the general case the press-drawn sections will be soldered or welded to the base of the heat exchanger only by local heat input, for example by means of laser welding and/or laser soldering.

In a particularly preferred embodiment, the exchanger tubes are curved essentially in a U-shape and, in particular, are respectively fastened with an inlet end and an outlet end on the same base. This provides a layout according to a U-flow heat exchanger with press-drawn sections bent in a U-shape. Optimization of the flow of the second fluid inside the housing is particularly important for this heat-exchanger layout, and suitable configuration of the holding member can contribute to optimization of the flow process.

It is generally advantageous for the holding member to be fixed at least partially by spring-elastic means, particularly in the manner of a clip. In this way, the holding member can be mounted simply and rapidly. As an alternative or in addition to spring-elastic and/or clamping fixation, a material-fit fixation may however also be provided, for example by means of welding or adhesive bonding.

Furthermore, the holding member may preferably comprise at least two holding member parts. In this case, the holding member particularly preferably has a first, central holding member part and at least one, particularly at least two outer holding member parts respectively adjacent thereto. The first holding member part may be arranged between two rows of exchanger tubes, in which case the outer holding member parts may be fixed on the central holding member part by a resilient fastening means, for example in the manner of clip fastening. To simplify and reduce the costs of producing and storing the components, some of the holding member parts, for example the two outer parts, may be formed as identical parts. Advantageously, a web extending transversely to the exchanger tubes is formed on at least one of the holding member parts. Such a web may engage over a plurality of exchanger tubes and, for example, brace them against one another by appendages formed on it and projecting between neighboring exchanger tubes.

In another alternative or supplementary embodiment, the holding member is directly adjacent to the base. In this way, the holding member can delimit flow regions on the base in respect of the flow of the second fluid, so that both an inlet and an outlet for the second fluid can be arranged in the immediate vicinity of the base without a short circuit of the flow of the second fluid taking place. In an alternative embodiment, however, a distance may deliberately be provided between the holding member and the base, with a connection for the second fluid being arranged in the vicinity of the base. The incoming or outgoing fluid is thereby distributed over the entire width of the base, without the holding member standing in the way of its flow. In such an embodiment, a corresponding second connection will generally be arranged in the region of an end of the housing on the opposite side from the base.

In a particularly preferred embodiment, the holding member consists essentially of plastic so that even complicated shapes of the holding member can be produced simply, economically and while saving on weight. Different holding member parts may then be connected to one another, for example by film hinges, in order to further simplify assembly. The formation of resiliently fastening undercuts in the manner of clips for fixing different parts of the holding member to one another is also particularly easy to carry out in a configuration made of plastic. In particular polyamide, for example PA6 or PA6.6, is suitable as a robust and thermally stable plastic. The properties of the plastic may be optimized in a known fashion by adding fibers or mineral substances.

In a preferred refinement of the invention, the holding members are formed so that, owing to their geometrical configuration, they can also be used as cassetting aids to connect the tubes for the connecting process carried out after cassetting. In particular, the holding member has the grid dimension or hole pattern of the base, so as to provide pre-centering of the tube or tube pack for connecting in the base.

In a preferred configuration of the invention, the holding member and the tubes are integrally connected to one another after assembly, so as to provide simpler handling for the subsequent assembly and/or manufacturing processes.

In an alternative embodiment, the holding member may also be formed essentially as a sheet-metal shaped part. In such a configuration, in order to achieve a particular mechanical strength, at least one part of the holding member may be connected to at least one of the exchanger tubes by a material fit, in particular by means of soldering. To this end, for example, the exchanger tubes and/or holding member may comprise solder plating, in which case a cassetted or preassembled module consisting of a plurality of individual parts may be soldered in a soldering furnace.

In order to optimize the flow of the second fluid around the exchanger tubes, the holding member may advantageously at least partially occupy a region of space between the exchanger tubes. Such a region of space, particularly when the heat exchanger is formed as a U-flow heat exchanger, may be arranged between the limbs of an inner one of the exchanger tubes extending in a U-shape. These design-related free regions of space generally cause an undesired flow of the second fluid, which with an unfavorable configuration may lead to a short circuit between the inlet and the outlet of the second fluid. By appropriate configuration of the holding member to block or fill such unfavorable regions of space, the flow through the housing and flow around the exchanger tubes inside the housing can be improved considerably.

In another alternative embodiment of the invention, the holding member comprises a multiplicity of pins projecting between neighboring exchanger tubes. Such a configuration of a holding member can be produced simply and economically.

As an alternative or in addition, the holding member may comprise a multiplicity of bent fasteners projecting between neighboring exchanger tubes.

In another alternative or supplementary embodiment, the holding member may be formed as sheet-metal strips having a multiplicity of bead-like protuberances, with the bead-like protuberances projecting between neighboring exchanger tubes.

Again as an alternative or in addition, the holding member may be formed as a plate part, extending essentially perpendicularly to the exchanger tubes, having apertures through which the exchanger tubes engage.

The holding member may also be a prismatic elongate body, which is formed in particular as a press-drawn section. Such a press-drawn section may, for example, be pressed in and held spring-elastically between the limbs of an exchanger tube bent in a U-shape.

In another suitable embodiment, the holding member may comprise a hollow body composed of at least two sheet-metal shaped parts. With a corresponding configuration, such a hollow body is particularly suitable for favorably influencing the flow paths of the second fluid. For example, a cavity existing between parallel limbs of a U-shaped exchanger tube may be filled by such a hollow body.

It is generally advantageous for the holding member to be braced against the housing. Vibrations can be avoided particularly reliably in this way, since in the end a force fit is formed between the exchanger tubes and the housing wall.

Particularly advantageously, the holding member extends at least in places in a gap between the housing and the exchanger tubes. The region between the housing and the outermost exchanger tubes is often critical in respect of an undesired flow of the second fluid. This applies in particular for cast housings which, owing to their production process, by their very nature have a slightly conical profile of the housing wall for releasability from the casting core. The gap between the housing wall and the exchanger tubes will therefore generally have a variable size, so that the holding member can in particular extend in an especially wide gap region in order to reduce a flow of fluid through this gap region, which is ineffective for the exchanger performance.

Other advantages and features may be found in the exemplary embodiments described below and in the dependent claims.

BRIEF DESCRIPTION OF THE DRAWINGS

Several preferred exemplary embodiments of the invention will be described below and explained in more detail with the aid of the appended drawings.

FIG. 4 shows a second holding member part of the heat exchanger of FIG. 1.

FIG. 5 shows a spatial view of a holding member of another exemplary embodiment of the invention.

FIG. 6 shows a view of a part of the holding member of FIG. 5.

DETAILED DESCRIPTION

Figure 1:
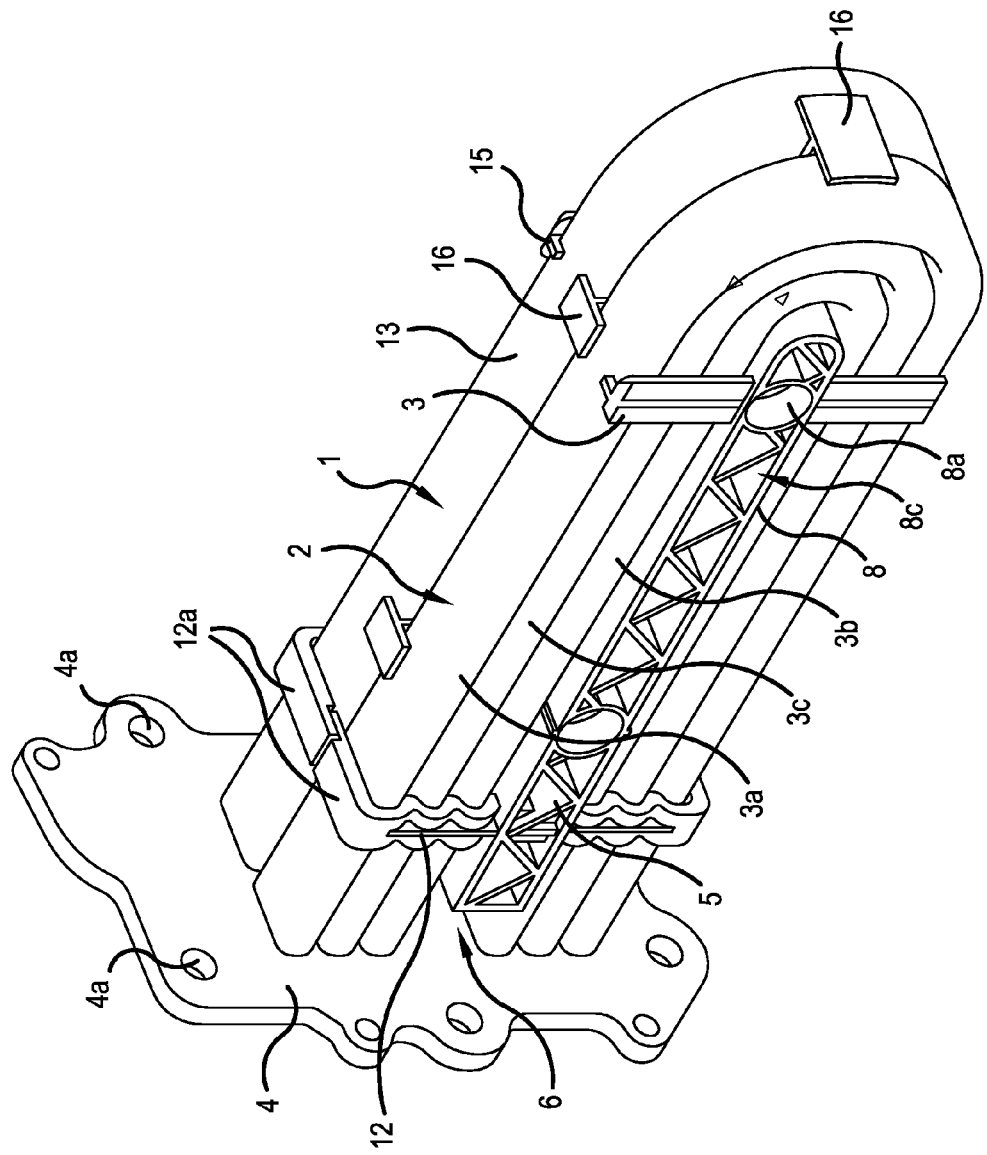
FIG. 1 shows a spatial view of a first exemplary embodiment of a heat exchanger according to the invention.
Figure 1A:
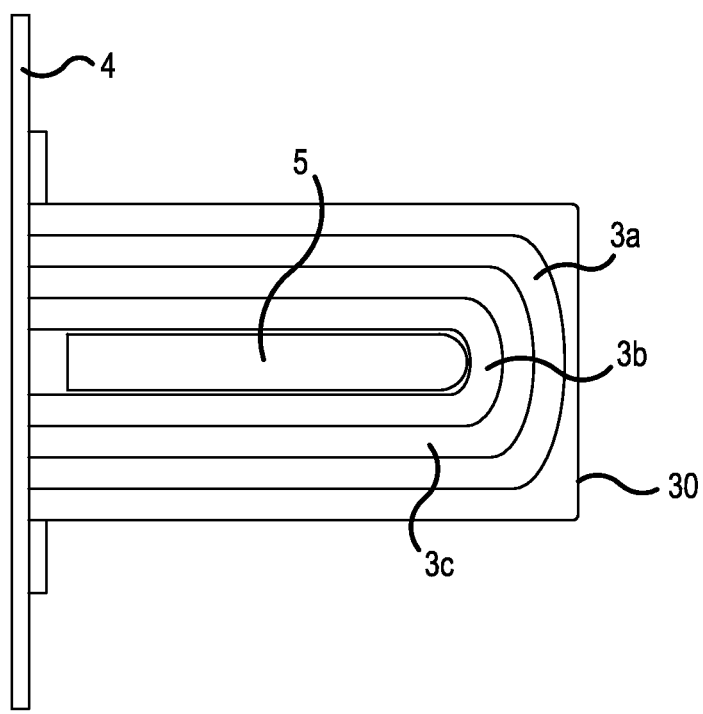
Figure 2:
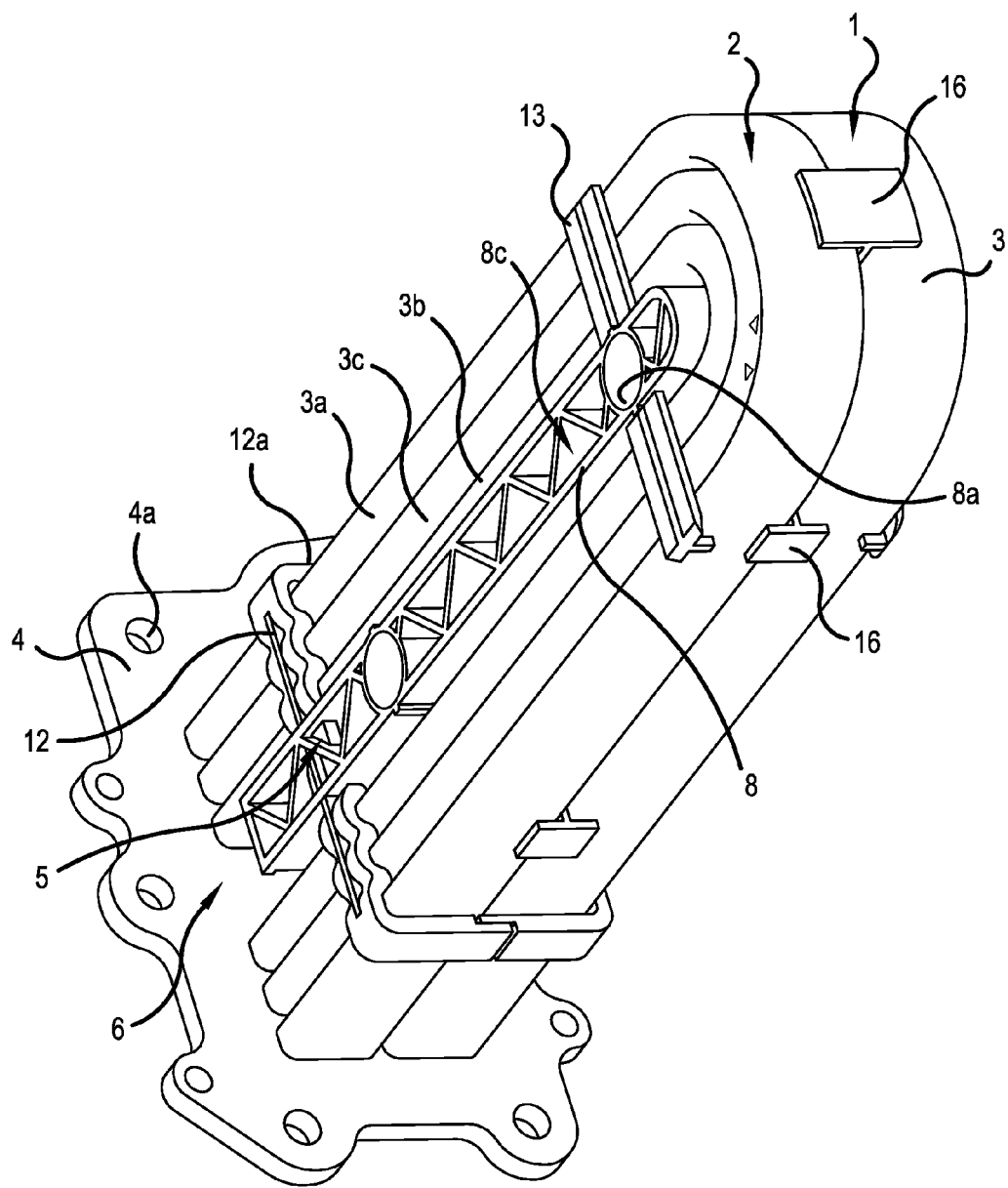
FIG. 2 shows the heat exchanger of FIG. 1 in another perspective.

The heat exchanger according to the invention, as shown in FIG. 1, is an exhaust gas heat exchanger for the indirect liquid-cooled cooling of exhaust gas recycled for pollution abatement from a combustion engine of a motor vehicle. The heat exchanger is configured as a U-flow heat exchanger and has a first row 1 and a second row 2, parallel thereto, of exchanger tubes 3. Each of the rows 1, 2 of exchanger tubes 3 comprises three exchanger tubes bent in a U-shape and nested in one another, i.e. respectively an outer exchanger tube 3a, an inner exchanger tube with the smallest bending radius 3b and a central exchanger tube 3c extending between the two exchanger tubes 3a, 3b. In total, the heat exchanger therefore comprises six exchanger tubes respectively bent in a U-shape.

All the ends of the exchanger tubes 3 lie in a plane and open in a base 4 of the heat exchanger. In the region when they open into the base 4, they are connected by means of a local connecting method, in particular by means of welding, for example by means of laser welding.

The exchanger tubes 3 are respectively formed as press-drawn sections made of an aluminum alloy, and the base 4 also consists of aluminum. The exchanger tubes 3 have an elongate cross section in the manner of a flat tube, and they are subdivided into a plurality of chambers by webs (see for instance FIG. 8).

The bundle of exchanger tubes 3 is arranged in a housing (not shown), the base 4 being fastened tightly on the housing by means of screw holes 4*a* in the manner of a flange. In the housing, in the vicinity of the base 4, there is a first connection for the second fluid, i.e. a liquid coolant for flowing around the exchanger tubes 3 conveying exhaust gas. The other connection for the coolant lies on the part of the housing on the opposite side from the base 4, i.e. in the region of the bends of the exchanger tubes.

For mechanical stabilization, and in order to optimize the flow paths of the coolant, a holding member 5 is arranged between the exchanger tubes 3. The holding member 5 consists of a glass fiber-reinforced plastic, in the present case of a polyamide. The inner exchanger tubes 3*b* enclose by their two limbs a region of space 6 which is partially filled by the holding member 5. This prevents a considerable fraction of the flow of the liquid coolant from traveling through the region of space 6 instead of flowing around the walls of the exchanger tubes 3.

Figure 3:
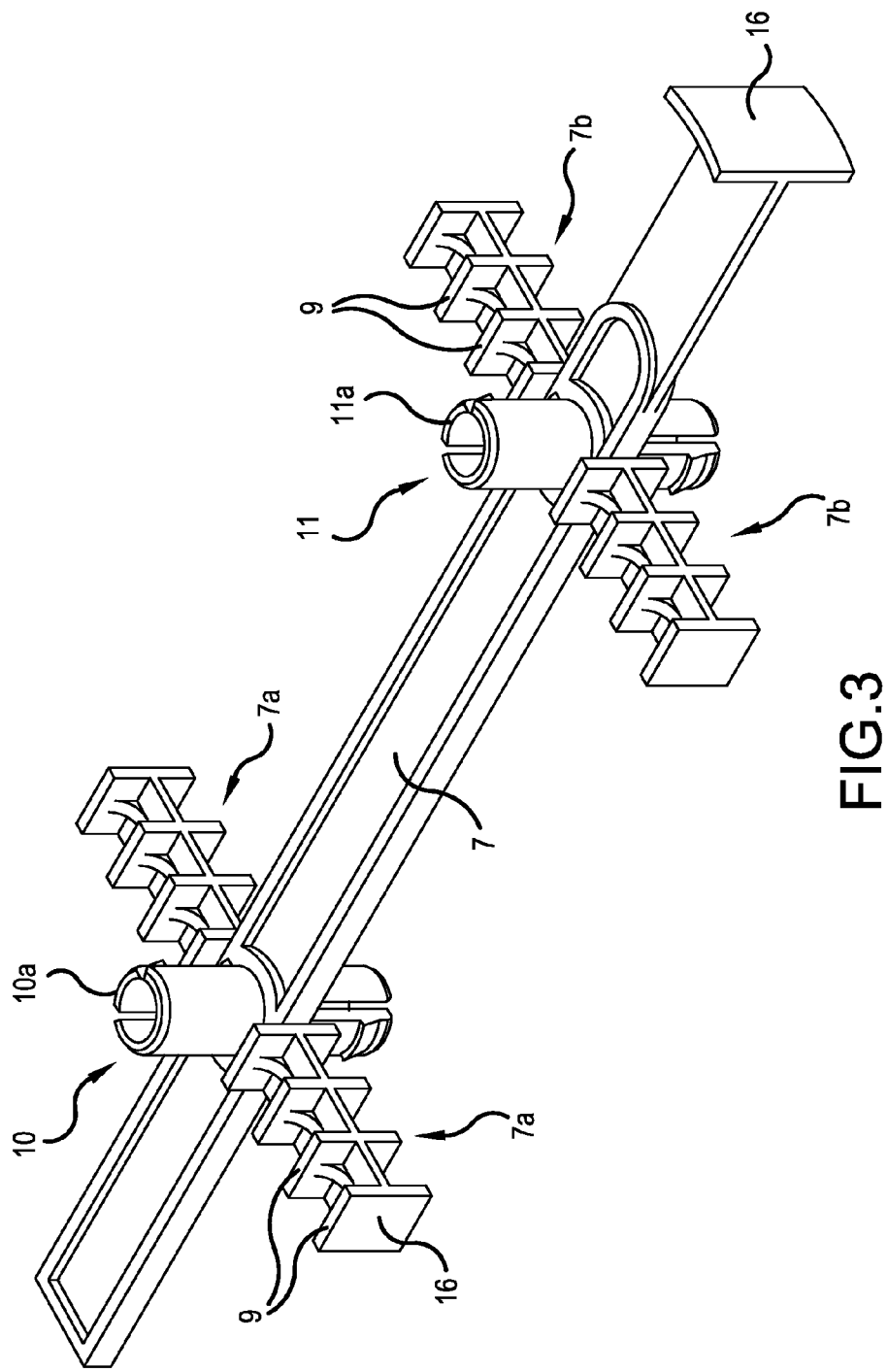
FIG. 3 shows a first holding member part of the heat exchanger of FIG. 1.

The holding member 5 consists of a first, central holding member part 7 and a second and identical third holding member part 8 (see FIG. 3 and FIG. 4). The two rows 1, 2 of exchanger tubes 3 are placed on each side of the central holding member part 7 during assembly of the heat exchanger. In order to position them, webs 7*a*, 7*b* which extend essentially perpendicularly to the exchanger tubes are provided on the central holding member part 7. Appendages 9, which position the exchanger tubes 3 and brace them against one another by projecting into the intermediate spaces between the exchanger tubes 3, are formed on the webs 7*a*, 7*b*.

The central holding member part 7 also has cylindrical fastening means 10, 11, each of which comprises a spring lug 10*a*, 11*a*, extending level with the webs 7*a*, 7*b* on both sides of a plate-shaped base.

After placing the two rows of exchanger tubes 1, 2 respectively on one side of the central holding member 7 by form-fit engagement with the appendages 9, the outer holding member parts 8 are placed externally on the bundles of exchanger tubes 3. To this end, the outer holding member parts 8 respectively have hollow cylindrical apertures 8*a*, 8*b* into which the cylindrical appendages 10, 11 of the central holding member part 7 engage, with the spring lugs 10*a*, 11*a* interlocking with an undercut. In this way, the holding member parts 7, 8 are fixed to one another in the manner of a clip.

The outer holding member parts 8 are formed in their central region as extended bodies which partially fill the region of space 6, a hollow chamber grid structure 8*c* being provided in order to save on weight and material.

Two webs 12, 13, aligned perpendicularly to the exchanger tubes, are likewise formed on the outside holding member parts 8. The webs 12, 13, in a similar way to the webs 7*a*, 7*b* of the central holding member part, have appendages 14, 15 for form-fit engagement and to brace the exchanger tubes 3.

The web 12, closer to the base 4, of the outer holding member part 8 also has externally enclosing extensions 12*a* which, in the assembled state (see FIG. 1), form a circumferential engagement of the bundle of exchanger tubes 3. Owing to this circumferential engagement, a gap between the exchanger tubes 3 and the housing can be reduced, particularly in the vicinity of the base 4. This is expedient in particular when the housing is formed as a cast part and/or has a certain production-related conicity of its walls, so that the gap between the exchanger tubes 3 and the housing is particularly large in the vicinity of the base 4. In this way, an undesired excessive flow through this region of space can be reduced or avoided by the enclosing web 12. On the central body of the outer holding member part 8, a plurality of appendages 8*d*, preferably of elongate shape, are also arranged on the surface facing toward the inner exchanger tube 3*b*, so that the body is placed clamped between the limbs of the inner exchanger tube 3*b*.

The holding member 5 also has a multiplicity of support plates 16 (see FIG. 3), by which it is braced against the housing, on its outermost extensions. Overall, the bundle of exchanger tubes 3 is prevented by the holding member 5 from movement of the exchanger tubes with respect to one another and from movement of the exchanger tubes relative to the housing.

The holding member 5 also serves for simple assembly of the heat exchanger by initially allowing alignment and pre-assembly of the bundle of exchanger tubes 3. After the bundle of exchanger tubes 3 has been preassembled and aligned by the holding member 5, the base 4 is placed on the bundle of exchanger tubes 3 and locally welded.

In a variant of the embodiment described above, at least two of the holding member parts 7, 8 may also be formed integrally, for example by joining them to one another by film hinges. In this way, assembly is further simplified.

Another embodiment of the invention is represented in FIG. 5. The bundle of exchanger tubes, and its arrangement relative to the base 4 and the housing (not shown), is identical in all the exemplary embodiments described, so that in part only the holding members configured differently depending on the exemplary embodiment are represented. FIG. 5 shows such a holding member constructed from sheet-metal shaped parts. It comprises a hollow body 18 constructed from two sheet-metal shaped parts 17 (see FIG. 6), a web 19 constructed from two shaped sheet-metal strips being arranged between the two sheet-metal shaped parts 17 in the region of grooves provided for this. Similarly as in the first exemplary embodiment, the web 19 extends perpendicularly to the lengthwise direction of the exchanger tubes 3, and has appendages 19*a* which correspond with the exchanger tubes and project into the region between two neighboring exchanger tubes for the purpose of bracing them against one another.

The hollow body 18 also has a circumferential, protruding edge 18*a*, which projects between the respective inner exchanger tubes 3*b* of the rows 1, 2 and braces these two exchanger tubes against one another.

The hollow body 18 also has a spacer 20, which extends in the region of the bend of the exchanger tubes 3, is braced against the housing wall and ensures a defined gap between an end face 21 of the hollow body 18 and the inner face of the inner exchanger tube 3*b*.

The sheet-metal shaped parts shown may in particular be plated with solder, so that they can be soldered flat to the exchanger tubes by heating in a soldering furnace in the preassembled state. Other material-fit joints, for instance adhesive bonding, may be envisaged at least for the purpose of assembling the heat exchanger.

Figure 7:
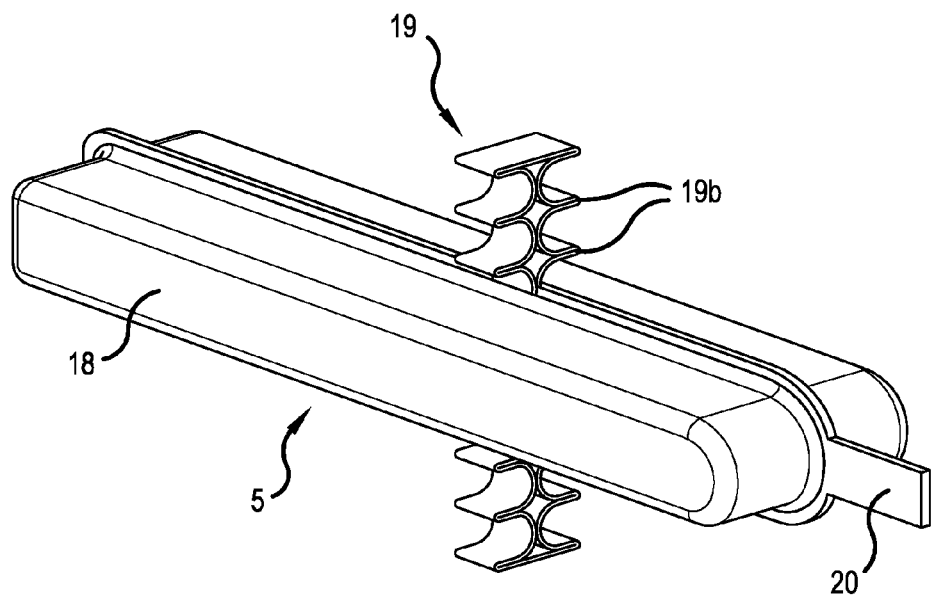
FIG. 7 shows a variant of the holding member of FIG. 5.

FIG. 7 shows a variant of the embodiment according to FIG. 5, where in contrast to the configuration according to FIG. 5 the web 19 is formed as a more strongly bent sheet-metal shaped part provided with folded beads 19*b*. The appendages formed by the beads 19*b* can project further between the neighboring exchanger tubes and thus ensure better bracing of the exchanger tubes against one another.

Figure 8:
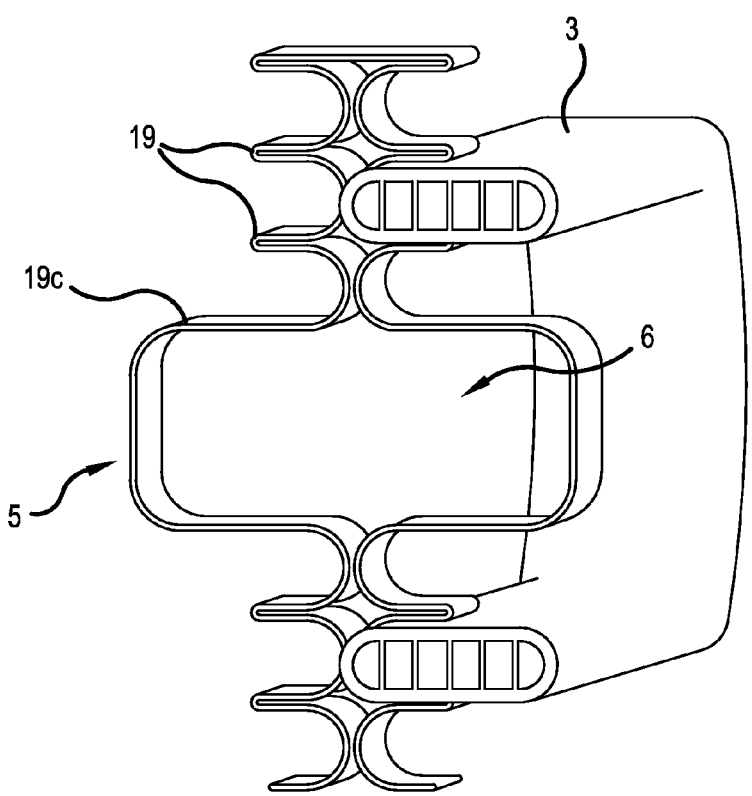
FIG. 8 shows another embodiment of a heat exchanger according to the invention with a holding member.

The exemplary embodiment according to FIG. 8 shows a web 19 formed similarly as in the exemplary embodiment according to FIG. 7, which also has a bulging waist 19*c* in the central region of space 6. With this bulging waist 19c, it can for example externally enclose a hollow body 18 according to FIG. 5 or FIG. 7.

Figure 9:
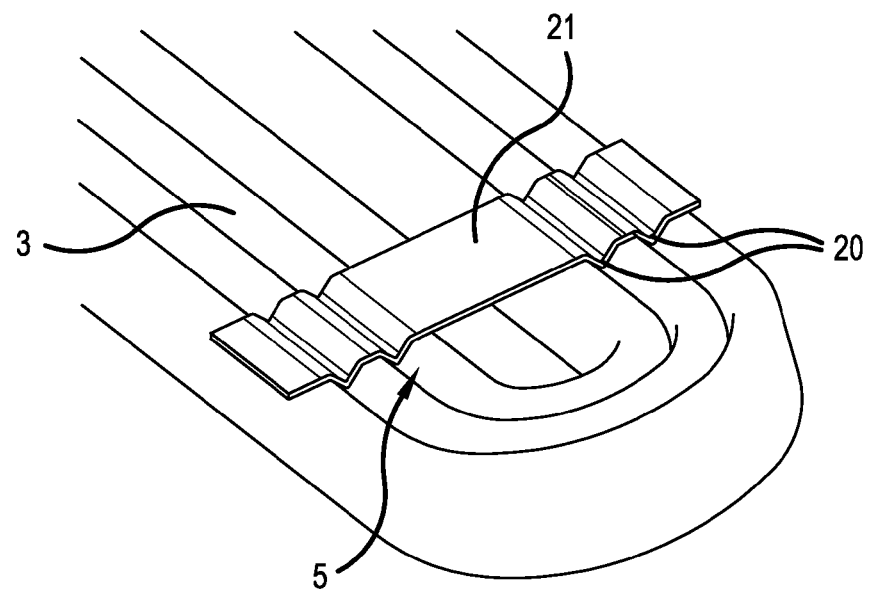
FIG. 9 shows another embodiment of a heat exchanger with a holding member.
Figure 10:
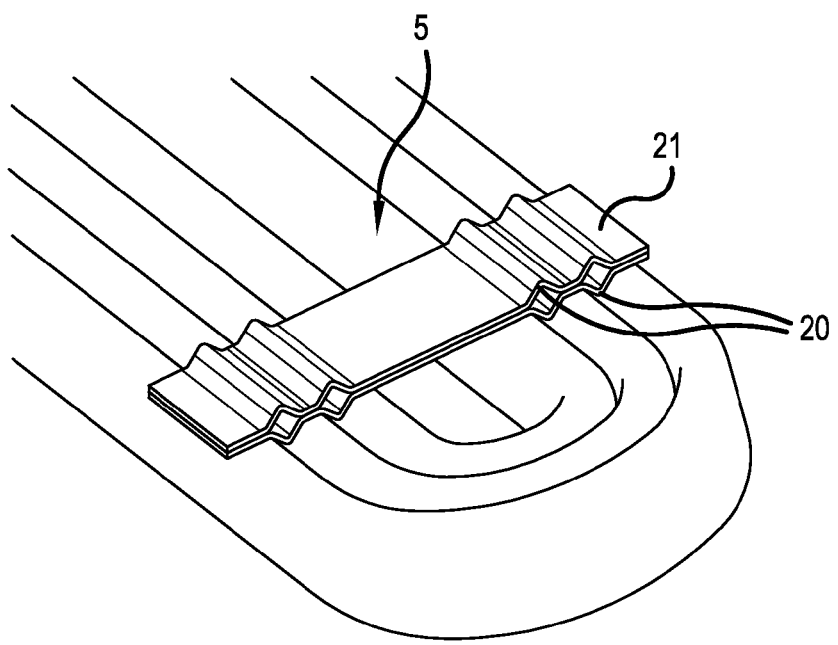
FIG. 10 shows a variant of the heat exchanger with a holding member of FIG. 9.

The exemplary embodiment according to FIG. 9 shows a sheet-metal strip 21, which is provided with bead-like appendages 20 and rests on a pack of exchanger tubes 3, the appendages 20 projecting between the exchanger tubes and bracing them against one another. In FIG. 10, two of the sheet-metal strips 21 are placed inverted on one another so that the holding member 5 formed overall by this has a bracing effect on two superimposed rows of exchanger tubes 3. The sheet-metal strips 21 may respectively be soldered to the exchanger tubes or only held by clamping.

Figure 11:
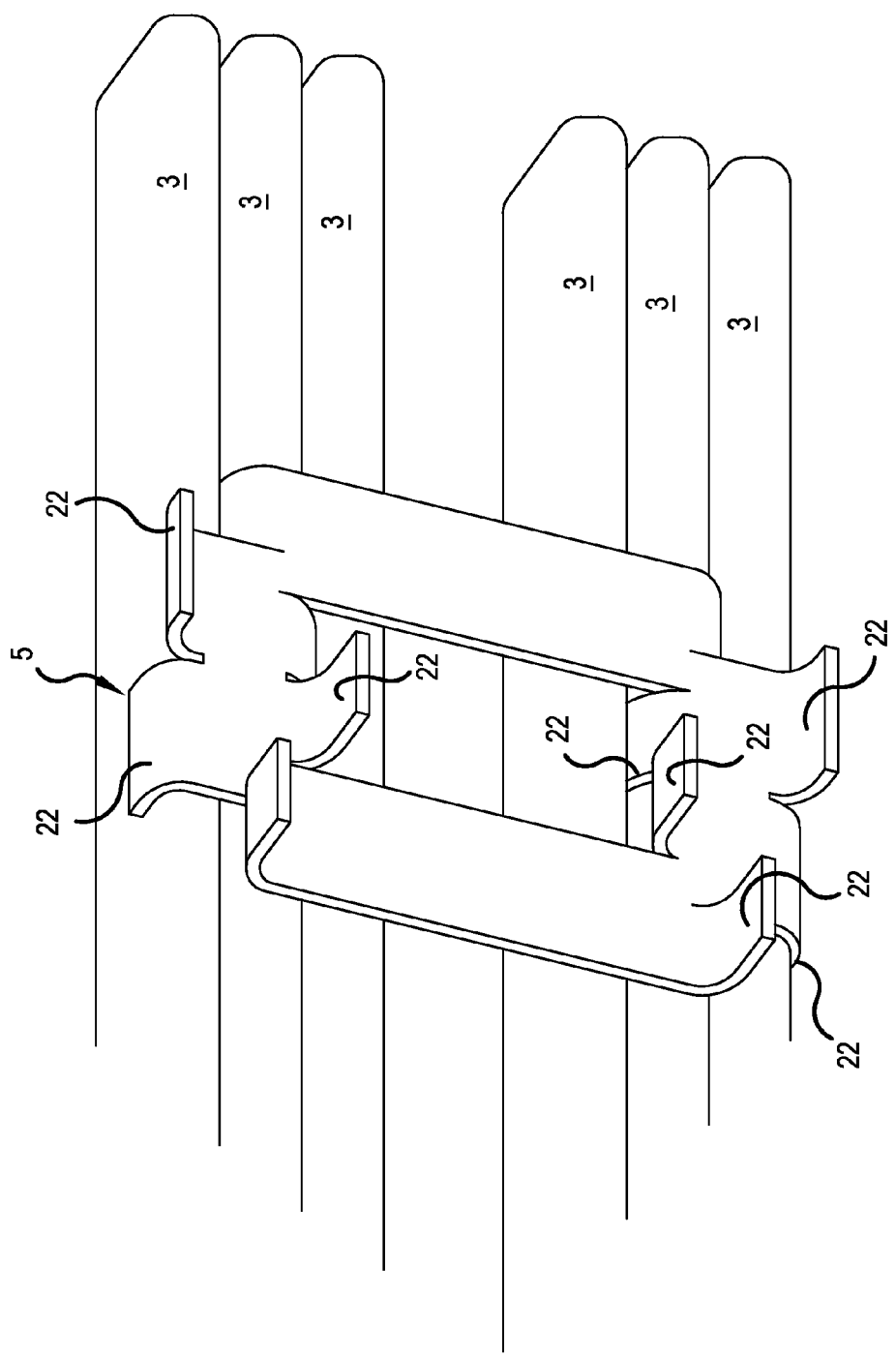
FIG. 11 to FIG. 13 respectively show other embodiments of a heat exchanger according to the invention with a holding member.

In the exemplary embodiment according to FIG. 11, the holding member 5 is formed as a sheet-metal shaped part having a multiplicity of bent fasteners 22, the fasteners 22 respectively engaging into the intermediate spaces of neighboring exchanger tubes 3 and thus bracing the exchanger tubes against one another.

Figure 12:
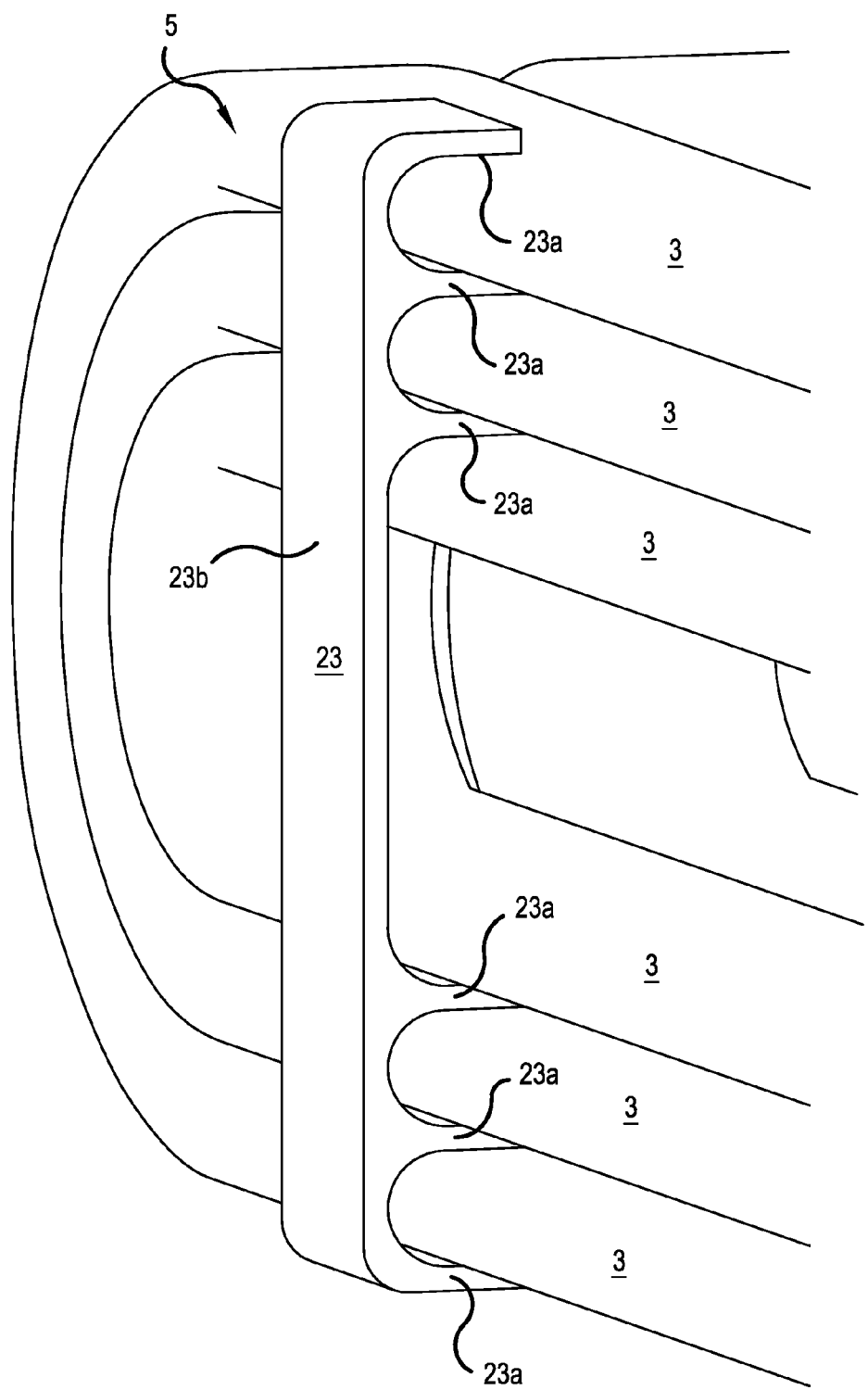

FIG. 12 shows a sheet-metal shaped part 23, produced for example by deep drawing, by which a holding member 5 in the context of the invention is likewise formed. The sheet-metal shaped part 23 engages with appendages 23a between the housing wall and the outer exchanger tube, or between two neighboring exchanger tubes 3. The sheet-metal shaped part 23 is braced by a rear side 23b facing toward the housing and likewise braced against it.

Figure 13:
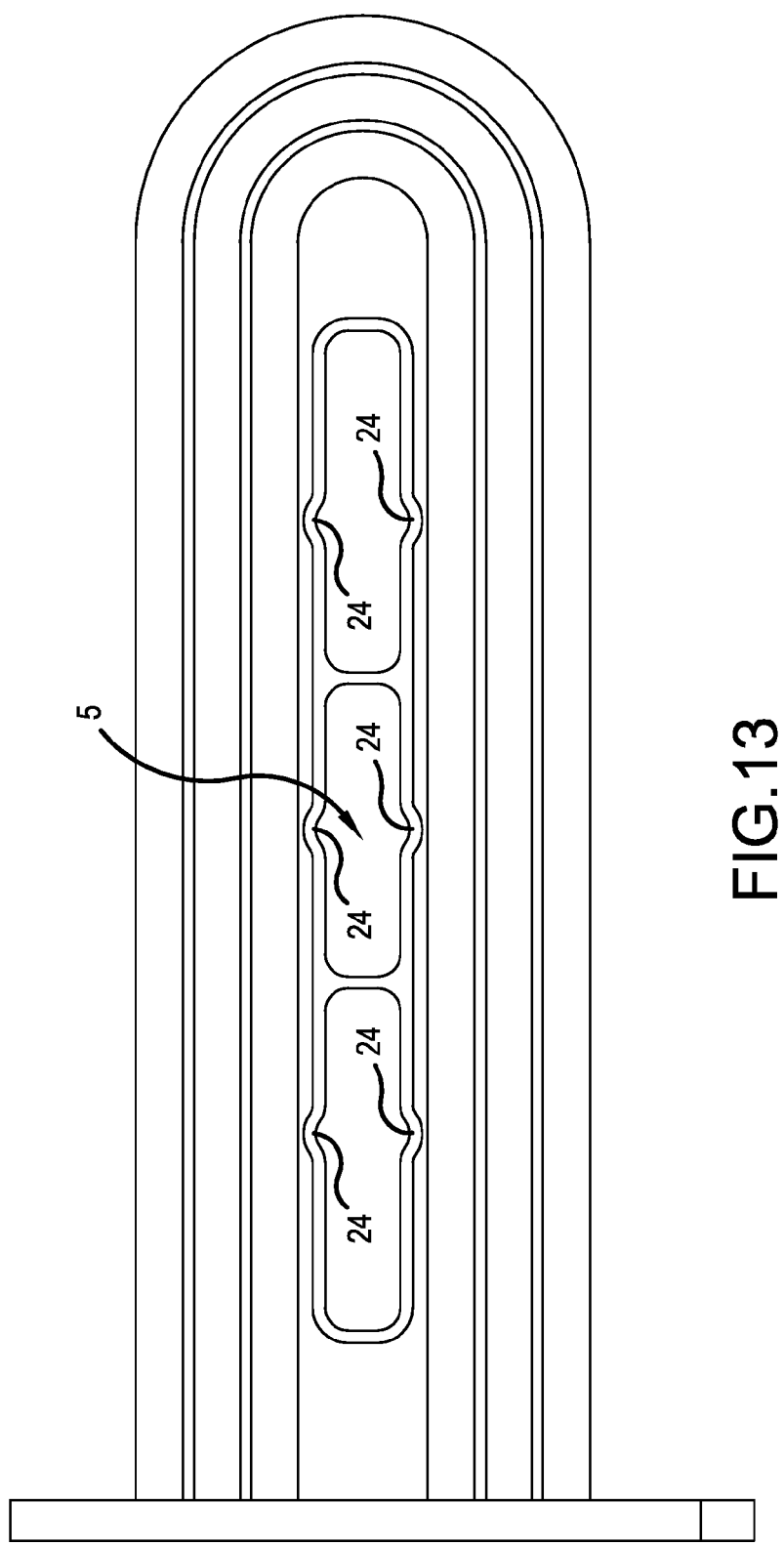

FIG. 13 shows an embodiment of the invention in which the holding member 5 is formed as a portion of a deep-drawn section, or as a prismatic body. By sufficiently thin formation of its walls and the provision of corresponding wall appendages 24, the holding member 5 can be placed clamped between the two limbs of the inner exchanger tube bent in a U-shape. In this case, on the one hand it acts to inhibit vibration and on the other hand blockage of the central region of space 6 can readily be achieved in respect of liquid coolant flowing through.

Figure 14:
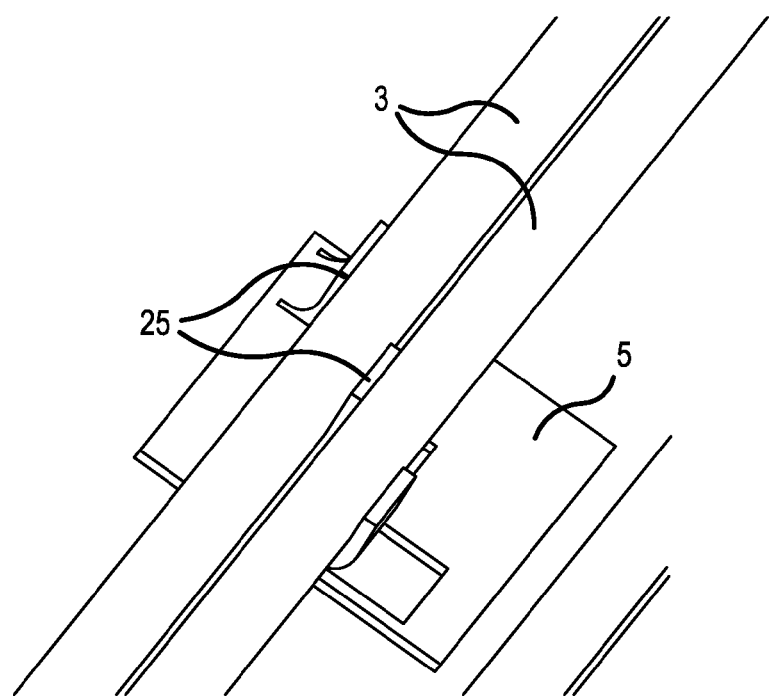
FIG. 14 shows a spatial representation of another exemplary embodiment of the invention.
Figure 15:
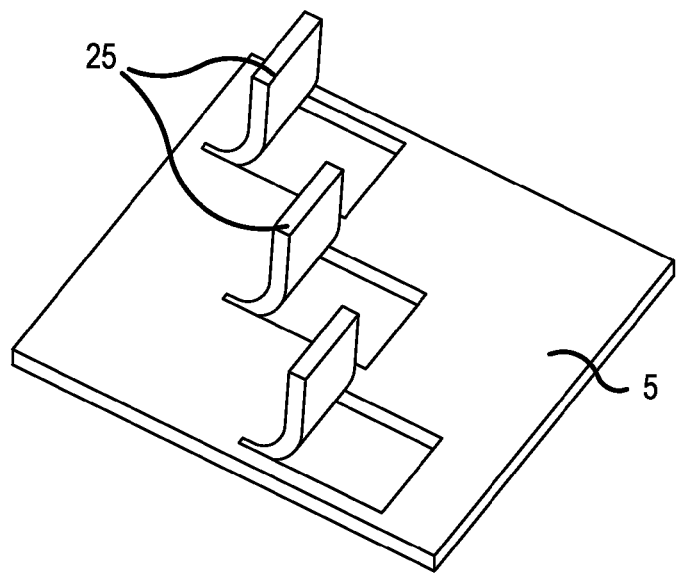
FIG. 15 shows a holding member of the embodiment of FIG. 14.

FIGS. 14 and 15 show another embodiment, in which the holding member 5 is formed as a sheet-metal shaped part with bent fasteners 25, the fasteners 25 projecting between neighboring exchanger tubes 3 and bracing them against one another. The sheet-metal shaped part 5 according to FIGS. 14 and 15 can be produced particularly simply and economically, for example by means of stamping.

Figure 16:
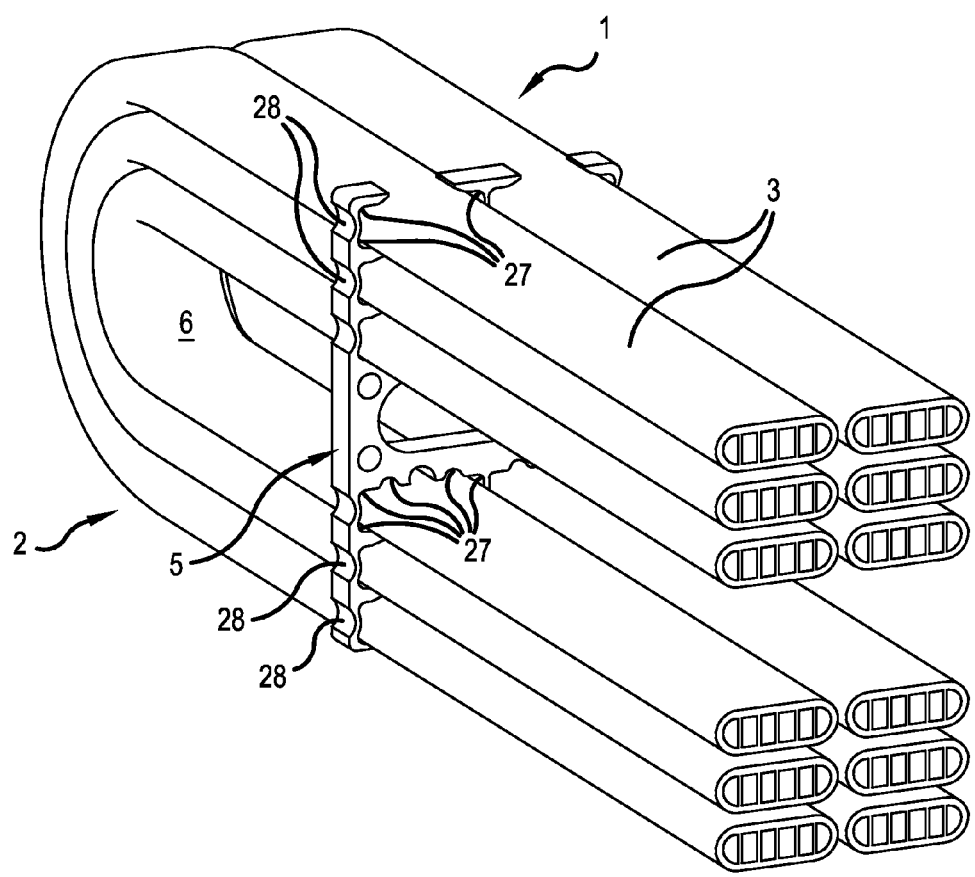
FIG. 16 shows another exemplary embodiment of the invention.
Figure 17:
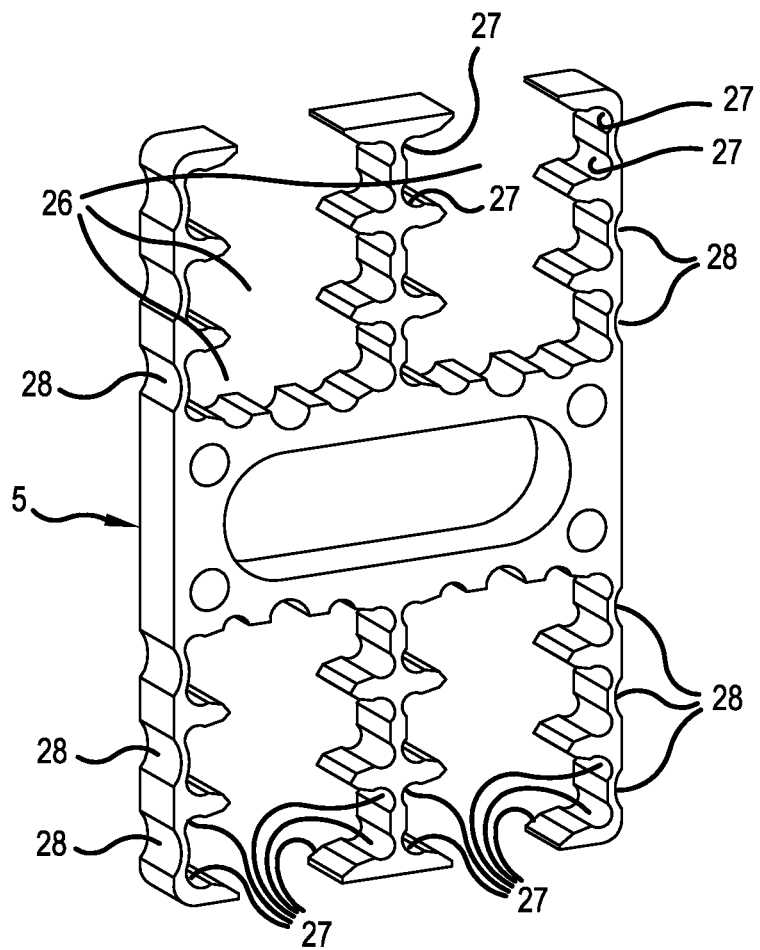
FIG. 17 shows a holding member of the embodiment of FIG. 16.

In the exemplary embodiment according to FIG. 16 and FIG. 17, the holding member 5 is formed as a plate body having apertures 26, with the exchanger tubes 3 engaging through the apertures 26. The holding member 5 furthermore has first recesses 27 for passage of the coolant. These apertures ensure that the coolant can flow through the holding member along the exchanger tubes 3, and as far as possible the coolant also flows around the exchanger tubes in the region where they are held by means of the holding member.

The holding member 5 furthermore has second recesses 28 in the region of the holding member 5, in which the holding member is braced, in particular on the housing (not represented). The effect of these recesses 28 is that the coolant can flow essentially unimpeded along the housing wall, so that the housing wall is cooled optimally.

Figure 18:
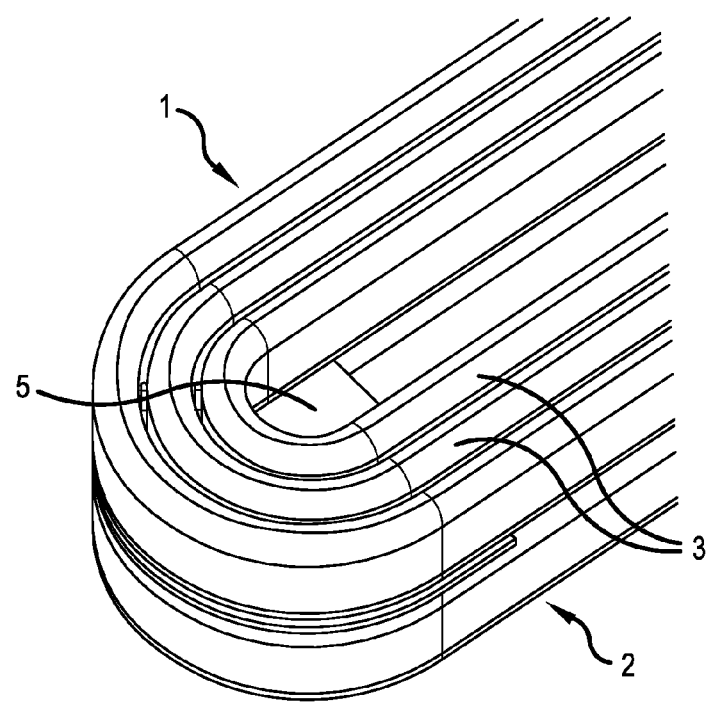
FIG. 18 shows another exemplary embodiment of the invention.
Figure 19:
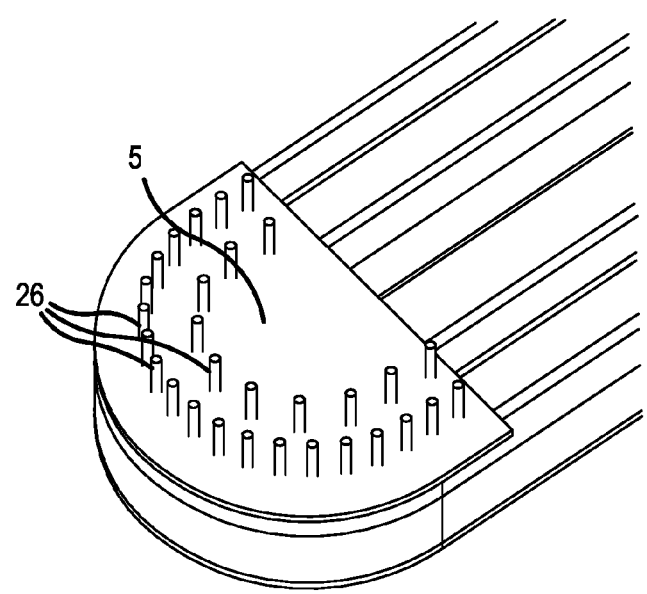
FIG. 19 shows the heat exchanger of FIG. 18 with the omission of a row of exchanger tubes.

In the exemplary embodiment according to FIG. 18 and FIG. 19, the holding member 5 is formed as a sheet-metal plate having a multiplicity of pins or bolts 26 which engage perpendicularly through the sheet-metal plate. The sheet-metal plate is placed between the neighboring rows 1, 2 of exchanger tubes, the perpendicularly extending pins 26 projecting into the intermediate spaces between the nested exchanger tubes 3a, 3b, 3c and thus ensuring mutual bracing of the exchanger tubes.

The invention claimed is:

1. A heat exchanger for a motor vehicle, comprising;
a multiplicity of exchanger tubes for conveying a first fluid, which are fastened on at least one base, the exchanger tubes being arranged in a housing through which a second fluid flows,
wherein a holding member is arranged inside the housing, at least two of the exchanger tubes being braced relative to one another by means of the holding member,
wherein the exchanger tubes are curved essentially in a U-shape and are respectively fastened with an inlet and an outlet end on the base,
wherein the exchanger tubes define a region of space between them,
wherein the holding member comprises a first portion which extends at least partially along the space, and a second portion which extends from the first portion to interact with the exchanger tubes to brace them relative to one another,
wherein the holding member comprises at least two holding member parts, and
wherein a web extending transversely to the exchanger tubes is formed on at least one of the holding member parts, and
wherein appendages projecting between neighboring exchanger tubes are formed on the web.

2. The heat exchanger as claimed in claim 1, wherein the heat exchanger is an exhaust gas cooler for cooling recycled exhaust gas of a combustion engine.

3. The heat exchanger as claimed in claim 1, wherein at least one of the exchanger tubes is formed as a press-drawn section.

4. The heat exchanger as claimed in claim 3, wherein said at least one of the exchanger tubes is based on aluminum.

5. The heat exchanger as claimed in claim 1, wherein the at least two holding member parts are fixed to each other at least partially by spring-elastic means.

6. The heat exchanger as claimed in claim 5, wherein the holding member is fixed at least partially in the manner of a clip.

7. The heat exchanger as claimed in claim 1, wherein the holding member comprises a first, central holding member part and at least one outer holding member part respectively adjacent thereto.

8. The heat exchanger as claimed in claim 7, wherein the central holding member part is arranged between two rows of exchanger tubes.

9. The heat exchanger as claimed in claim 7, wherein the outer holding member part and the central holding member part can be fixed to one another by a resilient fastening means.

10. The heat exchanger as claimed in claim 7, wherein the holding member comprises at least two outer holding member parts.

11. The heat exchanger as claimed in claim 1, wherein a first holding member part and a second outer holding member part, formed identically to it, are provided.

12. The heat exchanger as claimed in claim 1, wherein the holding member consists essentially of plastic.

13. The heat exchanger as claimed in claim 1, wherein the region of space is arranged between the limbs of an exchanger tube extending in a U-shape.

14. The heat exchanger as claimed in claim 1, wherein the first portion extends in a first direction along a substantial portion of the space, and wherein the second portion extends laterally away from the first portion in a second direction which is substantially transverse to the first direction.

15. A heat exchanger for a motor vehicle, comprising;

a multiplicity of exchanger tubes for conveying a first fluid, which are fastened on at least one base, the exchanger tubes being arranged in a housing through which a second fluid flows, wherein a holding member is arranged inside the housing, at least two of the exchanger tubes being braced relative to one another by means of the holding member, wherein the exchanger tubes are curved essentially in a U-shape and are respectively fastened with an inlet and an outlet end on the base, wherein the exchanger tubes define a region of space between them, wherein the holding member comprises a first portion which extends at least partially along the space, and a second portion which extends from the first portion to interact with the exchanger tubes to brace them relative to one another, wherein the holding member comprises a central structure having a first portion extending along at least a portion of the space, and a second portion extending into contact with the exchanger tubes, wherein the holding member further comprises two outer members arranged on either side of the central structure, and wherein each of the outer members comprises a first portion extending along the space and a second portion extending from the first portion to interact with the exchanger tubes.

16. The heat exchanger as claimed in claim 15, wherein the outer members are affixed to the central structure by resilient fastening means extending from the central structure into openings formed in the outer members.

* * * * *